Patented Jan. 3, 1950

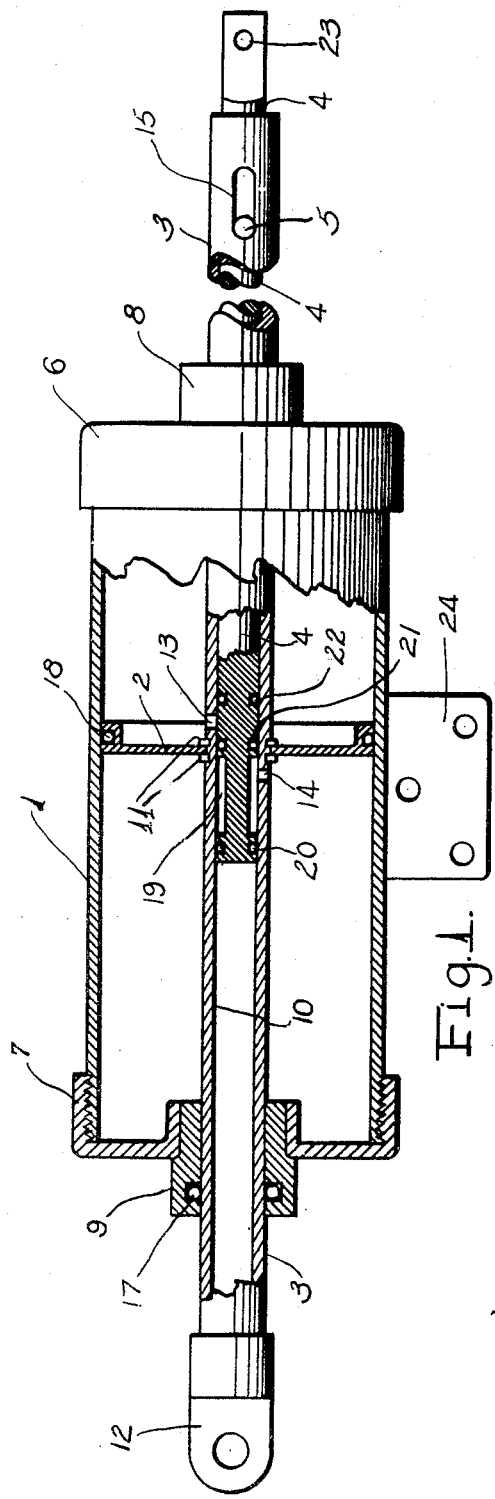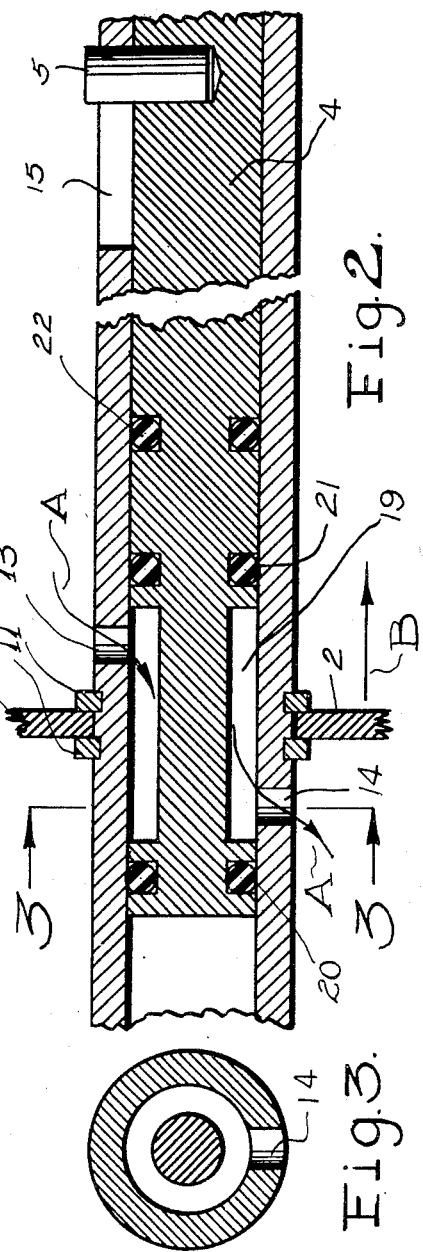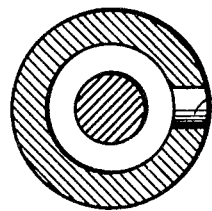
INVENTOR.
Thomas P. Hearne
BY
George Douglas Jones
ATTORNEY.

2,493,290

UNITED STATES PATENT OFFICE 2,493,290

POSITIONING DEVICE

Thomas P. Hearne, San Diego, Calif., assignor to The Ryan Aeronautical Co., San Diego, Calif., a corporation of California Application February 19, 1945, Serial No. 578,715

3 Claims. (Cl. 192—8)

This invention relates to a positioning device for use in maintaining various mechanisms or objects in certain adjusted position.

According to this invention a hydraulic cylinder having a reciprocating piston therein and a valve arranged to conduct fluid from one side of the piston to the other, or to restrict flow of the fluid, provides an arrangement whereby the piston in the cylinder may be maintained in certain position by hydraulic fluid at opposite sides thereof for controlling mechanisms or objects in connection with the plunger of said piston.

The fluid valve of this positioning device is reciprocally mounted in the plunger shaft in connection with the piston whereby fluid may be conducted from one side of the piston to the opposite side thereof through ports in the sidewall of the hollow piston rod.

This positioning device is particularly simple of operation since the valve plunger is reciprocally operated in the end of the piston plunger externally of the cylinder. The valve plunger is provided with a stop arranged to definitely position the valve for fixing the piston in position or permitting it to traverse the cylinder by-passing fluid from one side to the other of said piston.

Referring to the accompanying drawing:

Fig. 1 is a side elevational view of the positioning device showing portions broken away and in section to amplify the illustration.

Fig. 2 is an enlarged fragmentary sectional view of the piston plunger shaft and the valve plunger in connection therewith taken on a plane 90 deg. to that shown in Fig. 1 of the drawings.

Fig. 3 is a transverse sectional view taken from the line 3—3 of Fig. 2.

Similar characters of reference refer to similar parts and portions throughout the several views of the drawings.

The cylinder 1, piston 2, piston rod 3, valve plunger 4, and the stop pin 5 constitute the principal parts and portions of this positioning device. The cylinder 1 is a hollow circular in cross section cylinder having a smooth bore therein and is provided with caps 6 and 7 enclosing its opposite ends. Located centrally in the caps 6 and 7 are packing gland bosses 8 and 9 through which is positioned the piston rod 3, all as shown best in Fig. 1 of the drawing. This piston rod 3 is a hollow tubular member having a smooth bore 10 in which is reciprocally mounted the valve plunger 4. Fixed on the outer side of the valve plunger 4 is the piston 2. This piston 2 is secured on the piston rod 3 by means of snap rings 11 as shown best in Fig. 2 of the drawings. It will be noted that the piston 2 is provided with a close tolerance fit on the piston rod 3 in order to retain the fluid on opposite sides thereof. One end of the piston rod 3 is provided with a connection 12 arranged for use in securing mechanism thereto or objects to be controlled thereby. The piston rod 3 is provided with ports 13 and 14 communicating with opposite sides of the piston, as shown best in Fig. 2 of the drawings. The opposite end of the piston rod 3 from the connection member 12 is provided with a slotted portion 15 engaged by the stop pin 5 of the valve plunger 4 for limiting the reciprocal movement of the valve plunger 4 in the piston rod 3. It will be here noted that the packing gland boss 9 is provided with a packing ring 17 and that the packing gland boss 8 is provided with a similar packing to the packing ring 17 of the packing gland boss 9. The piston 2 is provided with a packing ring 18 engageable with the internal bore of the cylinder 1. The valve plunger 4 is provided with an elongated annular groove 19 arranged to communicate with the ports 13 and 14 in the piston rod 3 as shown best in Fig. 2 of the drawings. Near the extremities of this annular groove 19 are circumferential packing rings 20 and 21 in the valve plunger 4. In spaced relation to the packing ring 21 is the circumferential packing ring 22 disposed in connection with the valve plunger 4. The opposite end of the valve plunger 4 from the annular groove 19 is provided with a connection portion 23 arranged to be connected with any desired control for reciprocal operation of the valve plunger 4 as desired.

The operation of this positioning device is substantially as follows: This positioning device may be secured in stationary relationship to certain mechanism or objects by connecting the bracket 24 thereto, which is rigidly fixed to the cylinder 1. The connection member 12 on the end of the piston plunger 3 may be connected to the mechanism or object to be controlled. Assuming that the mechanism or object is a reciprocating member in connection with the connection member 12 and it is desired to position the same in certain spaced relation from the cylinder 1, the valve plunger 4 is shifted to the position as shown in Fig. 2 of the drawings permitting fluid to by-pass through the ports 13 and 14 in communication with the annular groove 19 and opposite sides of the piston 2. In this manner the piston 2 is readily moveable longitudinally in the cylinder 1 and the fluid in the cylinder 1 is by-passed from one side of the piston to the other through the ports 13 and 14 and the annular groove 19 as indicated by arrows A in Fig. 2 of the drawings. These arrows A indicate the flow of fluid when the piston 2 is moved in the direction as indicated by the arrow B in Fig. 2 of the drawings. When the piston rod 3 together with the controlled mechanism is positioned in the desired spaced relation from the cylinder 1, the valve plunger 4 is shifted to the solid line position as shown in Fig. 1 of the drawing whereby the port 13 is out of communication with the annular groove 19, shutting off the passage from one side of the piston to the opposite side thereof, thus the hydraulic fluid at opposite sides of the piston 2 provides a positive abutment which fixes the longitudinal disposition of the piston 2 in the cylinder 1.

Other embodiments of the invention employing the same or equivalent principle may be used and structural changes made as desired by those skilled in the art without departing from the present invention and within the spirit of the appended claims.

Having thus described my invention, what I claim as new and desire to secure by Letters Patent is:

1. A cylinder, a piston reciprocally mounted therein, a piston rod extending through said cylinder and outwardly at opposite ends thereof having a bore therethrough and provided with openings communicating with said bore at opposite sides of said piston, a valve plunger reciprocally mounted in said piston rod having an annular groove arranged to abridge said openings in the side wall of said piston rod and arranged to by-pass fluids from one side of said piston to the opposite side thereof.

2. A cylinder, a piston reciprocally mounted therein, a piston rod extending through said cylinder and outwardly at opposite ends thereof having a bore therethrough and provided with openings communicating with said bore at opposite sides of said piston, a valve plunger reciprocally mounted in said piston rod having an annular groove arranged to abridge said openings in the side wall of said piston rod and arranged to by-pass fluids from one side of said piston to the opposite side thereof, stop means in connection with said plunger and said piston rod arranged to limit the reciprocal movement of said plunger relatively to said piston rod for controlling the disposition of said annular groove relatively to said openings in the side wall of said piston rod.

3. A cylinder, a piston reciprocally mounted therein, a piston rod extending through said cylinder and outwardly at opposite ends thereof having a bore therethrough and provided with openings communicating with said bore at opposite sides of said piston, a valve plunger reciprocally mounted in said piston rod having an annular groove arranged to abridge said openings in the side wall of said piston rod and arranged to by-pass fluids from one side of said piston to the opposite side thereof, stop means in connection with said plunger and said piston rod arranged to limit the reciprocal movement of said plunger relatively to said piston rod for controlling the disposition of said annular groove relatively to said openings in the side wall of said piston rod, said plunger provided with annular grooves therein at opposite ends of said first mentioned annular groove and seal means in said second mentioned annular groove.

THOMAS P. HEARNE.

REFERENCES CITED

The following references are of record in the file of this patent:

UNITED STATES PATENTS

| Number | Name | Date |
|---|---|---|
| 2,365,247 | Carlton | Dec. 19, 1944 |

FOREIGN PATENTS

| Number | Country | Date |
|---|---|---|
| 501,449 | Great Britain | Feb. 28, 1939 |
| 710,182 | France | June 1, 1931 |